Patented Sept. 10, 1935

2,013,941

UNITED STATES PATENT OFFICE 2,013,941

STABLE VINYL RESINS AND PROCESS OF MAKING THE SAME

Charles O. Young and Stuart D. Douglas, Charleston, W. Va., assignors to Carbide & Carbon Chemicals Corporation, a corporation of New York No Drawing. Application March 28, 1931, Serial No. 526,123

10 Claims. (Cl. 23—250)

This invention relates to stable vinyl polymerization products, hereinafter referred to as vinyl resins, and to the process of making these stable vinyl resins.

It is well known that vinyl compounds may be caused to polymerize yielding resinous masses of considerable value. It is also known that mixtures of two or more vinyl compounds may be conjointly polymerized yielding a substance which is unlike the singly polymerized compounds, or mixtures of the individual polymers.

These resinous bodies are adapted to a wide variety of uses. They may be dissolved and employed as lacquers, paints, adhesives and the like, or they may be used in the solid state for the preparation of molding compounds and plastics of various kinds.

Vinyl resins heretofore produced have been unsatisfactory, in some respects, due to the fact that they are relatively unstable. In general these resins are affected by light or heat, tending to become brittle, discolored and otherwise deteriorated. We have discovered that vinyl resins may be rendered stable by the methods herein described.

In general, our invention comprises the incorporation of small amounts of substances having basic properties and which do not include in their composition any acid-forming or oxidizing groups, with vinyl resins to render them entirely stable. We may effect this addition before, during or after the polymerization, but we prefer to add the stabilizing substance to the polymerized resinous mass, inasmuch as some basic stabilizing substances may reduce the efficiency of the polymerization reaction. For instance, ammonia seriously inhibits the catalytic action of benzoyl peroxide in the polymerization of vinyl compounds.

The invention is not restricted to any particular means of adding the stabilizer. It may be added to the resin in solution or in the presence of a liquid which is not a solvent for the resin. The stabilizing substance, also, may be added to the dry resin in the solid form, as for example it may be added to the resin while the latter is being rolled and compounded for use as a plastic.

Substances which we have found to be useful as stabilizers include basic amino substances, such as various hydroxyalkylamines, hexamethylenetetramine and aryl or alkyl amines in general. Inorganic basic compounds, such as alkaline earth metal and heavy metal oxides and carbonates; ammonia and other basic substances related to the above compounds may be used.

Substances such as acetanilide, nitro naphthylamine and related compounds are not desirable because of the acidic acetate or nitro groups, similarly, compounds containing oxidizing groups are also unsuitable.

The following examples are illustrative of the invention:

I. Two hundred sixty pounds of vinyl chloride, 65 pounds of vinyl acetate, 325 pounds of toluene and 1.62 pounds of benzoyl peroxide are heated in a lead-lined autoclave with continual agitation at 70° C. A lively reaction occurs which abates after a few hours. The mass within the autoclave is now found to consist of a thick, viscous liquid. The unpolymerized vinyl compounds are removed by distillation in vacuo, and 0.43 pounds of pure triethanolamine are added and the mixture is thoroughly agitated. The resin solution thus stabilized is now ready for blending with suitable solvents for use as a heat and exposure resistant lacquer. If a dry solid resin is desired, it may be prepared by evaporating most of the toluene and adding the resin containing solution to a large quantity of a liquid, such as methanol or pentane, in which the resin is not soluble. A powder of the resin will be precipitated which may be recovered by filtration and drying.

II. Two hundred sixty pounds of vinyl chloride, 390 pounds of toluene and 1.3 pounds of benzoyl peroxide are heated together in a lead-lined autoclave with continual agitation at 70° C. At the end of the reaction, during which a thick, viscous liquid is obtained, the unpolymerized vinyl chloride is distilled off. To the resultant mixture is added 0.35 pound of hexamethylenetetramine, and the whole is thoroughly agitated. The mixture containing the stabilized resin is then poured into pentane and the resin is precipitated as a white powder. This solid resin is of value as a heat resistant plastic.

III. One hundred eighty pounds of vinyl chloride, 120 pounds of vinyl acetate, 300 pounds of toluene and 1.5 pounds of benzoyl peroxide are heated for 24 hours in a lead-lined autoclave with continual agitation at 70° C. A viscous liquid is obtained, from which the unreacted vinyl compounds are removed by distillation in vacuo. The solution of resin is then thoroughly agitated with the addition of 0.4 pound of aniline. The solution of stabilized resin thus obtained may be blended with suitable solvents for use as a heat and exposure resistant paint or lacquer.

IV. A dry resin prepared by the procedure described in Examples I or II, but which is not stabilized, is rolled on a differential roll preparatory to being compounded for use as a plastic. Steam is supplied to the inside of the rolls at a pressure of 40–50 pounds. While the resin is thus being heated and rolled, 0.2% its weight of hexamethylenetetramine is added and thoroughly admixed with the resin. The resultant resin is resistant to deterioration when subjected to heat, and is valuable as a molding plastic.

The invention is not restricted to the specific procedure or proportions of substances as set forth above, but includes within its scope the use of basic substances, particularly ammonia and organic derivatives of ammonia, as stabilizing substances for vinyl polymerization products, particularly those formed from vinyl halides, vinyl esters of aliphatic acids, or mixtures including these vinyl compounds.

We claim:

1. Heat and exposure resistant polymerization products of vinyl compounds of the group consisting of vinyl halides, vinyl esters of aliphatic acids and mixtures thereof which contain a stabilizing substance having basic properties and which is free from acid-forming and from oxidizing groups.

2. Heat and exposure resistant polymerization products of a plurality of vinyl esters including vinyl halides and vinyl esters of aliphatic acids which contain a stabilizing substance comprising a basic substitution product of ammonia which is free from acid-forming and from oxidizing groups.

3. Heat and exposure resistant polymerization products of a plurality of vinyl esters including vinyl halides and vinyl esters of aliphatic acids which contain a basic stabilizing substance which is free from acid-forming and from oxidizing groups.

4. A heat and exposure resistant polymerization product of a plurality of vinyl esters including vinyl halides and vinyl esters of aliphatic acids containing less than about 3% of a hydroxyalkylamine.

5. A heat and exposure resistant polymerization product of a plurality of vinyl esters including vinyl halides and vinyl esters of aliphatic acids containing less than about 3% of hexamethylenetetramine.

6. Process for preparing heat and exposure resistant polymerization products of vinyl compounds which comprises polymerizing vinyl compounds selected from the group consisting of vinyl halides, vinyl esters of aliphatic acids and mixtures thereof to form a resin, separating the resin so obtained from unpolymerized vinyl compounds and incorporating therewith a stabilizing substance having basic properties and which is free from acid-forming and from oxidizing groups.

7. Process for preparing heat and exposure resistant polymerization products of vinyl compounds which comprises polymerizing vinyl compounds selected from the group consisting of vinyl halides, vinyl esters of aliphatic acids and mixtures thereof to form a resin, separating the resin so obtained from unpolymerized vinyl compounds and incorporating therewith a stabilizing substance comprising a basic substitution product of ammonia which is free from acid-forming and from oxidizing groups.

8. Process for preparing heat and exposure resistant polymerization products of vinyl esters which comprises conjointly polymerizing a plurality of vinyl esters including vinyl halides and vinyl esters of aliphatic acids to form a resin, separating unpolymerized vinyl compounds from the resin so prepared and incorporating therewith a stabilizing substance which is basic and which is free from acid-forming and from oxidizing groups.

9. A process for preparing heat and exposure resistant polymerization products of a plurality of vinyl esters which comprises polymerizing vinyl esters including vinyl halides and vinyl esters of aliphatic acids to form a resin, separating the resin so obtained from unpolymerized vinyl compounds and incorporating therewith less than about 3% of a hydroxyalkylamine.

10. A process for preparing heat and exposure resistant polymerization products of a plurality of vinyl esters which comprises polymerizing vinyl esters including vinyl halides and vinyl esters of aliphatic acids to form a resin, separating the resin so obtained from unpolymerized vinyl compounds and incorporating therewith less than about 3% of hexamethylenetetramine.

CHARLES O. YOUNG.
STUART D. DOUGLAS.